United States Patent
Smolarek et al.

[11] Patent Number: 6,010,555
[45] Date of Patent: Jan. 4, 2000

[54] VACUUM PRESSURE SWING ADSORPTION SYSTEM AND METHOD

[75] Inventors: James Smolarek, Boston; John Harry Fassbaugh, Elma; Michael Kenneth Rogan, Springville; Herbert Raymond Schaub, East Amherst, all of N.Y.

[73] Assignee: Praxair Technology, Inc., Danbury, Conn.

[21] Appl. No.: 08/964,293

[22] Filed: Nov. 4, 1997

[51] Int. Cl.[7] .................................................. B01D 53/047
[52] U.S. Cl. ............................ 95/98; 95/101; 95/102; 95/105; 95/130
[58] Field of Search ............................... 95/98, 100–105, 95/130; 96/130, 144

[56] References Cited

U.S. PATENT DOCUMENTS

| | | | |
|---|---|---|---|
| 2,944,627 | 7/1960 | Skarstrom | 95/130 X |
| 3,636,679 | 1/1972 | Batta | 95/130 X |
| 3,738,087 | 6/1973 | McCombs | 95/130 X |
| 4,065,272 | 12/1977 | Armond | 95/101 |
| 4,449,900 | 5/1984 | Tedford | 55/26 |
| 4,781,735 | 11/1988 | Tagawa et al. | 95/101 |
| 4,810,265 | 3/1989 | Lagree et al. | 95/101 |
| 4,840,647 | 6/1989 | Hay | 95/100 |
| 4,917,710 | 4/1990 | Haruna et al. | 95/102 |
| 4,969,935 | 11/1990 | Hay | 95/98 |
| 5,122,164 | 6/1992 | Hirooka et al. | 95/98 X |
| 5,156,657 | 10/1992 | Jain et al. | 95/101 |
| 5,223,004 | 6/1993 | Etéve et al. | 95/98 |
| 5,407,465 | 4/1995 | Schaub et al. | 95/101 X |
| 5,518,526 | 5/1996 | Baksh et al. | 95/100 |
| 5,536,299 | 7/1996 | Girard et al. | 95/101 |
| 5,540,758 | 7/1996 | Agrawal et al. | 95/101 |
| 5,565,018 | 10/1996 | Baksh et al. | 95/100 |
| 5,632,802 | 5/1997 | Grgich et al. | 96/130 X |
| 5,658,371 | 8/1997 | Smolarek et al. | 95/101 |
| 5,679,134 | 10/1997 | Brugerolle et al. | 96/130 X |
| 5,711,787 | 1/1998 | Neill et al. | 95/130 X |
| 5,716,427 | 2/1998 | Andreani et al. | 96/130 X |
| 5,733,359 | 3/1998 | Doong et al. | 95/98 X |
| 5,755,856 | 5/1998 | Miyake et al. | 95/101 |
| 5,772,737 | 6/1998 | Andreani et al. | 95/98 |

FOREIGN PATENT DOCUMENTS

038410A2  10/1981  European Pat. Off. .

*Primary Examiner*—Robert Spitzer
*Attorney, Agent, or Firm*—Robert J. Follett

[57] ABSTRACT

A vacuum pressure swing adsorbent (VPSA) system and method for separating a component from a fluid mixture and including a fluid source for introducing the mixture into the system and a supply apparatus for collecting the separated component. A pair of adsorbent bed vessels is interposed between the fluid source and the supply apparatus to adsorb and desorb a predetermined component under respective adsorption and desorption pressures characterized by a low pressure ratio and relatively high desorption pressure values. Implementation of a single-stage vacuum device made possible by the use of the high desorption pressure, results in further reduction in both equipment and operating costs.

12 Claims, 4 Drawing Sheets

VACUUM PRESSURE SWING ADSORPTION SYSTEM AND METHOD

FIELD OF THE INVENTION

The invention relates to vacuum pressure swing adsorption (VPSA) systems and methods for separating gas components from gas mixtures. More particularly the invention relates to a two-bed VPSA system and method utilizing inexpensive compressor components to separate oxygen from air employing a low ratio of adsorption to desorption pressure by utilizing a relatively high desorption (bottom) pressure and a simpler and faster process cycle.

BACKGROUND OF THE INVENTION

Relatively pure oxygen (i.e. an oxygen-containing gas having an oxygen content of 88% or more) has a number of desirable industrial and medicinal applications at various pressures and purities. The Earth's atmosphere, typically comprising nearly twenty one percent oxygen gas, is the natural candidate for use as an economical oxygen source. As a result, many of the most practical and economical oxygen production plants employ air separation systems and methods.

One of the more common systems for producing oxygen in relatively large volumes incorporates cryogenic technology to liquefy and separate a desired oxygen component of a predetermined purity from the air mixture. While this design works well for high-volume oxygen production (more than 300 tons per day) and/or very high-purity oxygen (such as 97–99.99%) the specialized cryogenic hardware and associated high capital start-up expenditures make such systems costprohibitive when used for production in low to moderate volumes e.g. from about 30 to about 200 tons per day of an oxygen containing gas with an oxygen concentration higher than about 88% and up to about 95%.

For manufacturing oxygen in moderate scale quantities and relatively low purities (typically 25 to 40%), a practical and highly advantageous air separation system utilizes a polymer membrane. The membrane has a relatively high selectivity to oxygen and high flux for nitrogen. Compressed air feeds the membrane that retains the desired oxygen component at a relatively moderate purity and passes the remaining (undesirable) components as waste. The oxygen content of the retentate can be increased by provision of two or more successive membrane separation stages. As an alternative to both multi-stage membrane technology and cryogenic processes, those skilled in the art have developed an air separation system that utilizes a molecular sieve adsorbent to efficiently produce oxygen at high purities usually ranging from approximately 88 to 93% and up to about 95%. Used in pressure swing adsorbent (PSA) and vacuum pressure swing adsorbent (VPSA) systems, the adsorbent typically acts on the quadrupole moment between the respective gas components (nitrogen and oxygen) in air to effect component separation.

The original PSA process was developed by Skarstrom, U.S. Pat. No. 2,944,627, and consists of a cycle including four basic steps: (1) Adsorption, (2) Depressurization, (3) Purge, and (4) Repressurization. Several variations of the Skarstrom cycle have evolved. One such system is described in Wagner U.S. Pat. No. 3,430,418, wherein at least four beds are required to produce product continuously. The extra cost and complexity of providing four beds rather than a lesser number (preferably two) generally makes the Wagner system economically unfeasible.

In U.S. Pat. No. 3,636,679, Batta described a system where compressed air and product oxygen (obtained from another bed going through the equalization falling step) are simultaneously introduced at opposite ends of the same adsorbent bed. Another process for achieving further savings in equipment cost by using a two bed system is described by McCombs in U.S. Pat. No. 3,738,087, wherein an increasing pressure adsorption step is employed with feed air introduced to a partially repressurized adsorbent bed. Following the work of McCombs, Eteve et al., U.S. Pat. No. 5,223,004 described a PSA process utilizing the following steps: (1) a countercurrent product pressurization starting from the low pressure level of the cycle to an intermediate pressure level, (2) a cocurrent feed pressurization from the intermediate pressure level up to the adsorption pressure without bleeding off, (3) a production step wherein air is admitted and oxygen is bled off cocurrently, (4) a step where oxygen is bled off by partial depressurization cocurrently, wherein the admission of air is discontinued, and (5) a desorption step by depressurization countercurrently down to the low pressure level of the cycle.

Many more variations of the original PSA cycle can be found in the literature. For example, U.S. Pat. Nos. 4,194,891, 4,194,892 and 5,122,164 describe PSA cycles using short cycle times, wherein smaller particle size adsorbents are used to reduce diffusive resistance; Doshi et al, U.S. Pat. No. 4,340,398, discloses a PSA process utilizing three or more beds, wherein void gas is transferred to a tank prior to bed regeneration, and later used for repressurization. In addition, a process modification to a two-bed PSA process incorporating tank equalization is disclosed in U.S. Pat. Nos. 3,788,036 and 3,142,547, where the conserved gas is used as the purge gas for another bed.

More recently, Tagawa et al., U.S. Pat. No. 4,781,735, discloses a PSA process using three adsorbent beds to produce oxygen, with enhanced oxygen recovery achieved by connecting the feed end of one bed to the feed end of another bed (bottombottom equalization), and for all or part of the equalization time, top-top bed equalization is carried out simultaneously with the bottom-bottom equalization. In addition, U.S. Pat. No. 5,328,503, Kumar et al, describes a PSA process that uses an initial depressurization step to provide a purge gas, followed by an optional bed-bed pressured equalization step. In accordance with this patent, at least two adsorbent beds are employed, and a combination of product and feed gas are used for repressurization of the adsorbent beds.

Liow and Kenny (AICHE J. vol. 36, p. 53, 1990) disclose a "backfill cycle" for oxygen production from air via computer simulation. They disclose that a countercurrent (with respect to feed direction) product repressurization step is beneficial when included in the cycle for producing an enriched oxygen product.

In U.S. Pat. No. 5,518,526 of Baksh et al, an improved PSA process is disclosed for separating a first gas, such as an oxygen containing gas, from gas mixtures such as air. The process involves the steps of simultaneous equalization and evacuation followed by simultaneous feed and product gas repressurization of PSA beds. This results in an overall faster and more efficient cycle with 100% utilization of a vacuum (or pressure reducing) blower, and a reduction in power use of about 15% over previously known processes. More specifically, the Baksh et al. process involves overlapping of various steps of the PSA cycle to reduce total cycle time and thus improve productivity. Other important parameters include choice of operating conditions (the value of the high pressure, the value of the low pressure, the pressure at the end of equalization falling step, and the amount of high purity product used in the product pressurization step), the time period allocated for each step, the order in which each step of the cycle is executed, and the use of equalization falling gas to provide the gas required for refluxing and equalization rising. The cycle includes the step of evacuating one bed ("first bed") undergoing the equalization rising step while simultaneously the other bed ("second bed") is undergoing the equalization falling step. The time allocated for this step must be chosen, so that at the end of this step, the first bed has been purged and also partially pressurized. The next step in the cycle is simultaneous product and feed pressurization at opposite ends of the first bed, followed by feed pressurization to the desired adsorption pressure. Other features of the Baksh et al. process are as follows: (a) the product gas required in the step of simultaneous feed and product pressurization usually comes from the product tank, or from another bed in the production step; and (b) the cocurrent depressurization or pressure equalization falling gas either goes to the downstream end of another bed or to a second storage tank. In the latter case, no bed-bed communication is required, which adds further flexibility in controlling the PSA process.

Copending commonly assigned U.S. patent application Ser. No. 08/611,942 filed Mar. 7, 1996, now U.S. Pat. No. 5,702,504, is directed to a VPSA process similar to that of Baksh et al. and also comprising (a) an additional countercurrent depressurization step to the bottom (desorption) pressure during which step nitrogen rich gas is discharged from both the feed end (waste) and from the product end (used to repressurize another bed) interposed between (i) a cocurrent depressurization to an intermediate falling pressure (and collecting equalization gas for the other bed) and (ii) a subsequent countercurrent depressurization and evacuation of nitrogen; and (b) an additional discharge of relatively nitrogen rich gas from the feed end while simultaneously purging with oxygen after (ii) and before completing the discharge of gas from the feed end.

Despite such desirable advances in the art, PSA/VPSA processes remain less efficient and more capital intensive, than desired, especially for high purity (about 88% up to about 95%) oxygen production in large plants, particularly as compared to the alternative of cryogenic distillation. There is a need in the art, therefore, for further improvements to make the use of the highly desirable PSA/VPSA technology in commercial plants efficient and therefore more economical.

Modern conventional VPSA systems operated on a commercial scale typically include a feed gas compressor for feeding an air mixture to an adsorbent "bed" that includes the molecular sieve adsorbent. The bed operates to selectively adsorb nitrogen from the air mixture at a predetermined (upper) adsorption pressure. Oxygen, as the less readily adsorbed component of the mixture, passes through and is discharged from the bed as a product stream. Once the nitrogen is adsorbed by the surface of the adsorbent bed, a vacuum system is connected to the bed to reduce the pressure to a bottom (desorption) pressure, causing the adsorbed (nitrogen-rich) gas to desorb and to be discharged from the bed as waste (or a byproduct). A purge mechanism plumbed to the bed cooperates with the vacuum system to purge residual nitrogen from the system. Oxygen is usually used as the purge gas.

A relatively efficient conventional industrial scale VPSA system having two or more adsorbent beds and associated separation method involves operating at relatively low pressure ratios (adsorption pressure/desorption pressure) typically approximating 4:1–5:1 with bottom (desorption) pressures 0.25–0.33 atmospheres or lower. Lower pressure ratios such as 2:1 or 3:1 in VPSA systems for the production of an oxygen rich gas containing 90% oxygen or higher have also been reported, e.g., in U.S. Pat. No. 5,074,892 to Leavitt. The system configuration used under such reduced pressure ratio operating conditions includes a conventional feed gas compressor, a multi-stage vacuum pump, and a pair of conventional adsorbent beds such as described generally above. The Leavitt patent acknowledges that bed size factor, i.e. the quantity of the adsorbent required to effect the separation, will increase with the reduced pressure ratio (although it will increase less than was expected based on the then state of the art). Leavitt does not propose any method for addressing the bed size factor increase nor any other method for further decreasing operating costs.

Thus, the prior art (both the patent/scientific literature and industrial practice) failed to realize that the lower pressure ratio alone or preferably together with certain process modifications would permit use of simplified and more economical equipment and more generally result in overall cost savings over and above those achieved with low pressure ratio alone. Generally, because conventional VPSA low pressure ratio systems having two adsorbent beds operate at relatively deep vacuums (even when the pressure ratio is relatively low), power-consuming multi-stage vacuum pumps (involving two or more vacuum stages) were typically required or were thought to be required. Such pumps often include two vacuum stages disposed in a cascade relationship with an interstage connection positioned therebetween. The interstage connection typically includes an inter-stage bypass unload system to discharge the suction of both stages to atmospheric pressure during idling or unloading operations. The bypass in turn includes an additional valve and associated plumbing to effect venting. Thus, multistage vacuum devices are considerably more complex than singlestage devices, and more expensive to operate.

The conventional two-bed VPSA systems also operate at longer cycle times (from a minimum of 40–50 seconds two 60–90 seconds for well-run, modern, conventional two-bed systems) in order to achieve the desired high oxygen recovery (usually within the range of about 40 to about 70%). This in turn increases not only the adsorbent requirement, but also the displacement of the entire system, contributing to the power consumption per unit product produced. Although it is possible to decrease cycle time somewhat, any advantage thus achieved is limited (or even eliminated) by the fact that higher gas velocities result, notably in the adsorber. Higher gas velocities cause the pressure drop across the adsorbent bed to increase, which lowers the efficiency of the process. Higher gas velocities also cause adsorbent "lifting" which then causes adsorbent attrition, another adverse contributor to overall cost. Thus, both of these consequences increase costs, which contravenes the purpose of using faster process cycles in the first place. Thus, with respect to two-bed, VPSA systems in the 30–200 tpd range that produce high-purity oxygen, and 90–95% in particular, there is still room for improvement of the process efficiency and for a further decrease in capital and/or operating costs. It should be noted that a savings in overall cost (operating cost and present value of capital cost) of even 1–2% is considered substantial in the air separation industry which is highly competitive.

Therefore, a need exists for a VPSA air separation system and method that implements a low pressure ratio and avoids the costly use of expensive vacuum equipment. Moreover, the need exists for lowering operating costs while still realizing attractive oxygen recoveries (e.g. 50–60% as opposed to 60–70%, generally representing a loss of 5–10 recovery points compared to a conventional two-bed system) to economically produce an oxygen containing gas. The vacuum pressure swing adsorption system and method of the present invention satisfies these needs. The present invention achieves lower overall cost through implementation of various novel process and apparatus features alone or in combination.

SUMMARY OF THE INVENTION

The vacuum pressure swing adsorption system and method of the present invention reduces the sum of capital investment and operating costs by implementing low power components and modified operating procedures to economically achieve efficient air separation at the required purity and volume of O2-containing product.

To realize the benefits and advantages above, in one aspect, the invention comprises a vacuum pressure swing adsorbent system for separating components of a fluid mixture. The system includes a fluid source for introducing the mixture into the system and establishing an adsorption pressure. A supply apparatus is implemented to collect a separated fluid product, enriched in a first mixture component, from the mixture. The system also includes two adsorbent vessels each comprising an adsorbent bed, each vessel being disposed downstream of the fluid source and upstream of the supply apparatus to adsorb selectively a second component from the mixture at the adsorption pressure and to allow the remainder of the mixture to pass to the supply apparatus as the separated fluid product (oxygen in air separation). Preferably, the mixture flows through the adsorbent in a radially inward direction by reference to said vessel.

A single-stage vacuum device connected to each of the two adsorbent beds generates a vacuum to provide a desorption pressure in each bed within the range from 0.3 to 1.0 preferably 0.4–0.55 atmospheres (shallow vacuum) following selective adsorption of a predetermined component by the bed. The desorption pressure has a pressure ratio relationship with the adsorption pressure in the general range of 2.5 to 4.0, preferably between 2.75 and 3. Each adsorbent bed is responsive to the desorption pressure to desorb the second component (nitrogen in air separation) which is then released from the system.

The inventors discovered further that as a result of the more elevated desorption pressure not only is it possible to use a single-stage vacuum device but its operation is rendered more efficient precisely because of the higher desorption pressure. The higher desorption pressure increases the average inlet pressure of the vacuum pump because the displacement of the pump remains constant but a greater mass of gas can be packed into the same volume at the higher desorption pressure.

As a result of the higher desorption pressure, the vacuum pressure swing adsorption (VPSA) process is conducted at a low pressure ratio (i.e. ratio of the top adsorption pressure to the bottom desorption pressure) within a range of 2.5 to 4.0, preferably within the range between 2.5 and 3.0, and most preferably between 2.75 and 3.

This lower pressure ratio expectably results in a somewhat (usually no more than 5–10 percentage points) lower product recovery (typically calculated as the percentage rate of pure O2 in product divided by pure O2 in the feed) which means that more of the oxygen contained in the feed ends up in the waste. This undesirable effect can be thought of as a reduction in the effective capacity of the system or as an increase in the specific energy requirement (e.g. power consumed per ton per day of O2 in product produced). This necessitates processing more air to maintain the same per day O2 output at the same purity (i.e. the same capacity).

However, this decrease in effective capacity is more than offset by the fact that the larger mass flow through the system further increases the efficiency of the single-stage pump. The aforementioned increase in suction pressure to the waste pump lowers the pressure differential across the vacuum pump (DpVP) which in turn lowers the head and specific work per mole of waste removed. Since the vacuum pump is a major contributor to operating costs, a significant net savings is realized.

In order to accommodate the higher air throughput, the system of the present invention employs (i) a radial flow adsorbent and/or vessel, and (ii) a shorter cycle time. This permits the process to maintain the cost savings afforded by the higher desorption pressure without use of a larger adsorber, which would diminish or eliminate this advantage.

The cycle time is reduced in at least two steps (or portions of steps, sometimes called substeps) in the cycle. This serves to permit the same amount of oxygen per day to be produced without unduly increasing the size of the adsorber and equipment or the gas velocity through the system during certain portions of the cycle. Velocities can be kept even lower by appropriate choice of the adsorbent bed vessel (a radial flow vessel is preferred).

Other features and advantages of the present invention will be apparent from the following detailed description when read in conjunction with the accompanying drawings. Furthermore, applicability of the invention extends to any fluid mixture containing at least one component that can be selectively adsorbed onto an adsorbent material and is not limited to air separation.

DETAILED DESCRIPTION OF THE INVENTION

Vacuum pressure swing adsorption (VPSA) systems offer a unique and relatively cost competitive way to separate oxygen from air. The systems generally rely on a molecular sieve adsorbent that adsorbs nitrogen from air, at specific adsorption pressures, and desorbs nitrogen from the bed, at specific, lower, desorption pressures. By implementing timed process steps at specified desorption pressures to effect an efficient cycle, VPSA systems can operate at efficiencies approaching those of permeable membrane systems.

The PSA process and apparatus of the system may use any type of equilibrium-selective adsorbent material including, but not limited to, A-zeolite, X-zeolite, Y-zeolite, chabazite, mordenite, and various ion exchanged forms of these, as well as silica-alumina, alumina, silica, titanium silicates, phosphates and mixtures thereof. A preferable adsorbent includes highly exchanged sodium zeolites X having a framework SiO2/Al2O3 ratio between 2.0 and 2.5 having at least 88% and preferably at least 95% of their AlO2 tetrahedral units associated with lithium cations. Preferred among the foregoing are those having a silica/alumina ratio as close to 2.0 as possible and as high a lithium exchange as possible.

Figure 1:
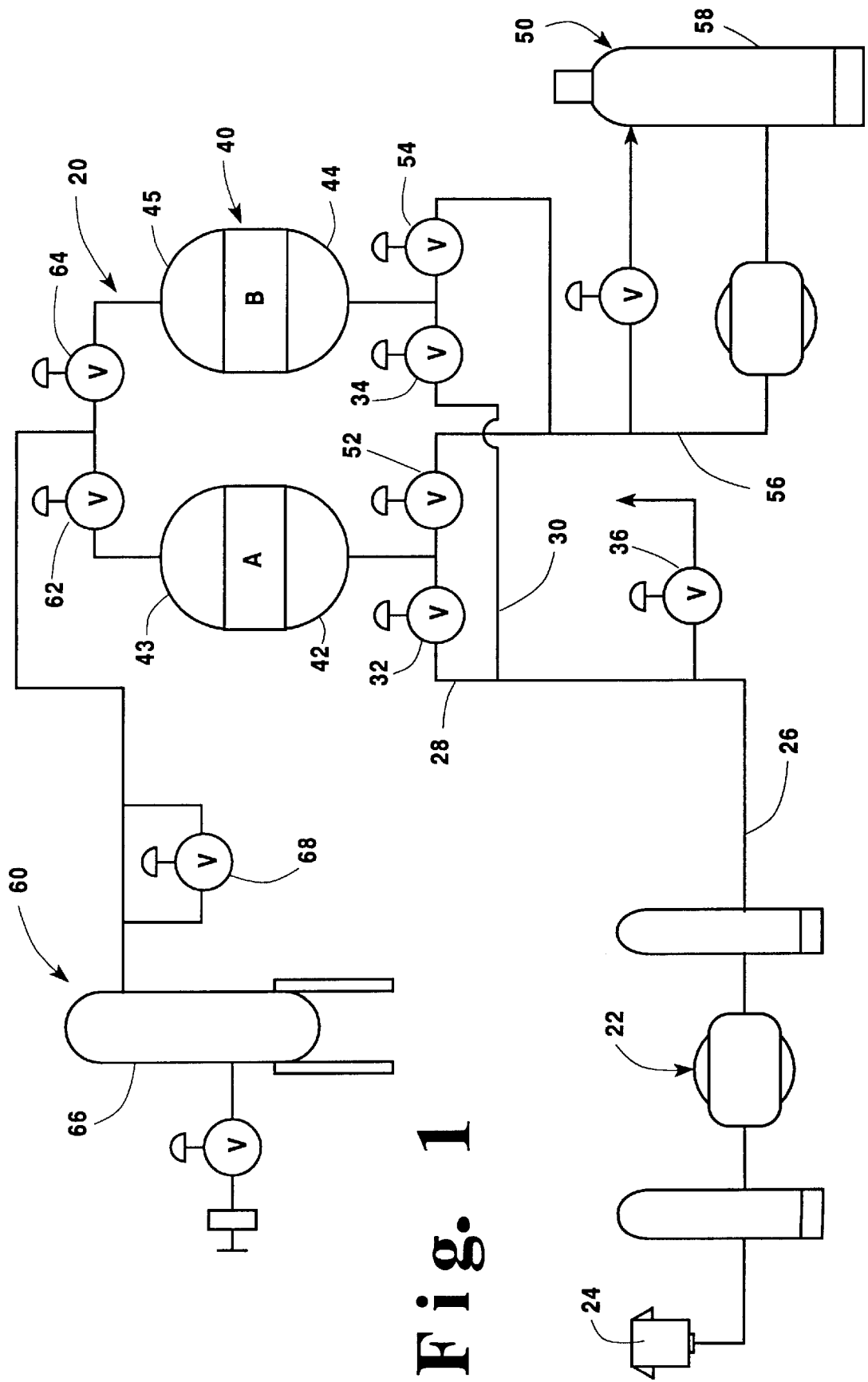
FIG. 1 is a schematic of a two bed vacuum pressure swing adsorbent system according to one embodiment of the present invention.

Referring now to FIG. 1, a vacuum pressure swing adsorption (VPSA) system according to one embodiment of the present invention, generally designated 20, includes a pneumatic source 22, an adsorbent bed unit 40, and a single stage vacuum unit 50 to efficiently produce oxygen from air at a relatively low pressure ratio and high bottom pressure. The pneumatic source 22 comprises a Roots type single-stage feed compressor having an inlet 24 for drawing air and directing a pressurized airflow through a discharge manifold 26 to respective parallel inlet lines 28 and 30. Respective first and second pressurizing control valves 32 and 34 are plumbed in the distal ends of the respective lines to selectively pressurize respective portions of the adsorbent bed unit 40. A vent valve 36 connects to an intermediate portion of the manifold 26 to selectively bypass airflow away from the bed unit. The valves are sequenced through a controller (not shown) according to timing corresponding to the process steps described below for the method of the present invention.

Further referring to FIG. 1, the adsorbent bed unit 40 comprises a dual adsorbent bed system, with bed A and bed B having respective bottom portions 42 and 44 disposed downstream of the respective first and second pressurizing control valves 32 and 34 in an alternating parallel arrangement. Respective top portions 43 and 45 provide a convenient interface for connecting a product supply mechanism 60 comprising a single product surge tank 66.

Each adsorbent bed is contained in a vessel, preferably of the radial flow type. Radial flow vessels are known and comprise an enlarged feed end of overall asymmetric cross-section of the gas flow. Radial flow vessels accommodate large gas flow ranges and provide only a low pressure drop (Dp) across the bed in the direction of gas flow. Radial flow vessels also provide a more uniform flow distribution with the bed and typically offer a restrained adsorbent bed with an enlarged inlet area. The use of such vessels is disclosed in copending commonly assigned U.S. patent application Ser. No. 08/681,550, now U.S. Pat. No. 5,759,242, incorporated by reference in its entirety.

The vacuum unit 50 includes respective first and second depressurizing control valves 52 and 54 that connect to a vacuum manifold 56. The valves are plumbed in parallel opposing relationship to the first and second pressurizing control valves 32 and 34. Like the pressurizing valves, the depressurizing and vent valves are sequenced by the controller (not shown). The manifold terminates in a low-power single stage Roots type vacuum pump 58 for evacuating the respective beds A and B during predetermined cycle steps according to the method of the present invention described below. Implementation of the power-conserving single stage pump is possible due to the relatively high desorption pressure (shallow vacuum), utilized in the VPSA operating cycle.

With continued reference to FIG. 1, the product supply mechanism 60 includes respective first and second product outlet valves 62 and 64 disposed at the top of the respective top portions 43 and 45 of beds A and B to direct product (oxygen) flow from each bed to purge the other bed, equalize the pressure in the other bed, or flow to surge tank 66 for storage. An isolation valve 68 interposed between the surge tank and the outlet valves cooperates with the outlet valves according to sequencing commands from the controller to effect the purge and/or equalization procedures.

Referring now to FIGS. 2 through 13, the VPSA system 20 of the present invention operates, according to one embodiment, by a method of the present invention that includes the steps of feeding an air mixture into the adsorption unit at an elevated flowrate, selectively adsorbing a first component (nitrogen) from the air mixture, passing the non-adsorbed component (oxygen or more accurately an oxygen-containing gas) as product, and depressurizing the adsorption unit to desorb the first component from the bed. It will be understood that the VPSA system operates cyclically, with each of beds A and B undergoing overlapping cycles and exposed to the same set of steps over time and with one bed undergoing the opposite step within a cycle compared to the other bed. For brevity, only the detailed cycle affecting one bed, bed A, will be described below.

Figure 2:
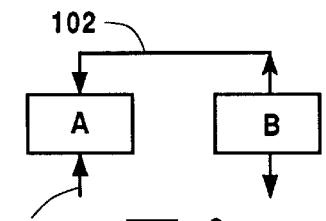
FIGS. 2 through 13 are block diagrams sequentially illustrating a vacuum pressure swing adsorbent method according to one embodiment of the present invention.

Referring now to both FIGS. 1 and 2, the operation of the VPSA system initially involves an overlap feed adsorption/oxygen equalization pressurization step that starts the feed air pressurization-adsorption period. With the first pressurizing valve 32 open and the second pressurizing valve 34 closed, the Roots type compressor 22 feeds air to the bottom portion 42 of bed A, at 100, with the pressure rapidly increasing over the duration of this step. Oxygen equalization gas from bed B is also simultaneously introduced into the top portion 43 of bed A, at 102, by opening both outlet valves 62 and 64 and closing the isolation valve 68.

Figure 3:
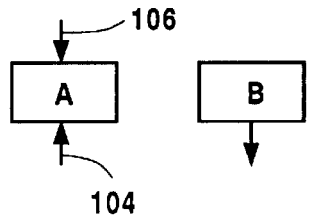

With reference to FIG. 3, the cycle progresses with an overlap feed adsorption/product oxygen pressurization step that continues the feed air pressurization adsorption period. Air continues to be fed to the bottom of the adsorber from the Roots type compressor, at 104. Additionally, both the isolation valve 68 and the first outlet valve 62 open to introduce oxygen into the top portion 43 of bed A, at 106, from the surge tank to repressurize the bed. As a result, the pressure continues to rise during this step.

Figure 4:
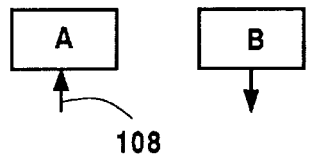

Referring now to FIG. 4, following the oxygen repressurization step, feed air is further introduced from the Roots compressor 22 to the bottom portion 42 of bed A, at 108, without any oxygen gas added or removed from the top portion 43 (Still no product is being made). The pressure again rises. Notably, the rate of pressure increases in the absence of oxygen reflux, is slower in this step as compared to the earlier steps.

Figure 5:
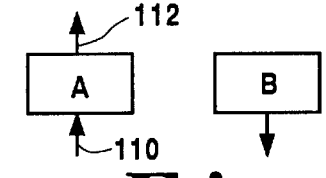
Figure 6:
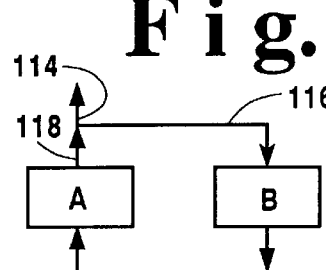

FIGS. 5 and 6 illustrate the next two cycle steps that involve constant pressure feed and product generation and reflux operations. As shown in FIG. 5, feed air continues to be introduced into the bottom portion 42 of the adsorber, at 110, while oxygen product is removed from the top portion 43, at 112. During these steps, the pressure remains relatively unchanged. With the isolation valve 68 and the respective outlet valves 62 and 64 open, oxygen product is supplied from bed A to (i) the oxygen surge tank 66, at 114, and (ii) to the top portion 45 of bed B as oxygen purge, at 116.

The purity of the oxygen product remains essentially constant during the product making steps of the cycle. This is because the oxygen repressurization step, at 106 (FIG. 3) introduces high purity oxygen into the top portion 42 of bed A prior to the oxygen make step, at 114 (FIG. 5), thereby eliminating any oxygen purity spikes at the beginning of the operation. The product make step continues, at step 118 (FIG. 6), then terminates prior to the nitrogen front actually breaking through at the top portion of the bed.

Figure 7:
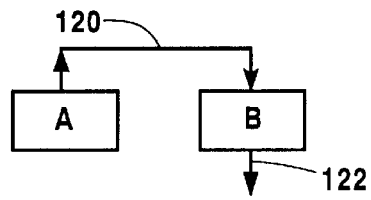

Referring now to FIG. 7, the cycle progresses with a falling pressure equalization step wherein the residual pressure and oxygen product at the top portion 42 of bed A is withdrawn and fed to the top portion 42 of bed B, at 120. No flow is removed from the bottom of the bed. The vessel pressure is lowered. If the specified product purity is 90%, the oxygen concentration falls to about 60–80% and typically 70% oxygen at the end of this step as the nitrogen front breaks through at the top. At this point, the Roots feed air compressor is vented by opening the vent valve 36.

Figure 8:
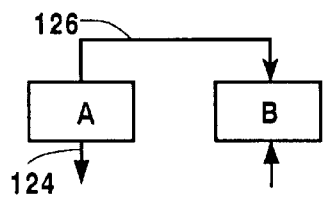

The falling pressure equalization steps, at 120 and 122 (FIG. 7), are followed by a falling pressure evacuation and overlap equalization step as illustrated in FIG. 8. (As used herein, "overlap" means simultaneously with all or a portion of another operation.) The respective first and second depressurizing valves 52 and 54 are opened to allow desorption and removal of waste nitrogen from the bottom of the adsorber, at 124, through the single stage Roots type vacuum pump 58. The pressure falls during this step. The oxygen concentration of the nitrogen waste starts at about air purity and falls rapidly to the minimum waste purity of about 2–10%. Carrying over from the previous step, the equalization flow of oxygen gas, at 126, continues to be removed from the top portion 43 of bed A to the top portion 45 of bed B.

Figure 9:
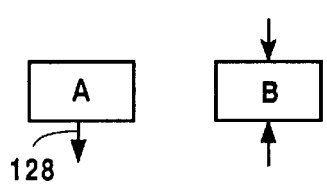
Figure 10:
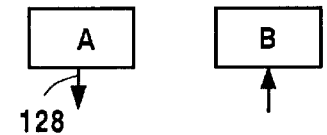
Figure 11:
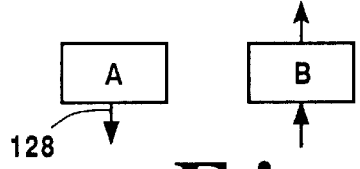

The cycle continues, as shown in FIGS. 9 through 11, with successive falling pressure evacuation steps wherein waste nitrogen is further removed from the bottom portion 42 of bed A, at 128, through the single stage Roots type vacuum pump 58. The pressure falls during this step. No gas flows into or out from the top of the adsorber.

Figure 12:
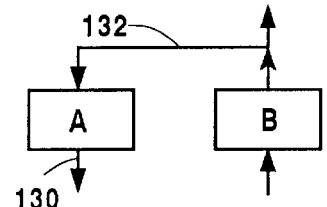

Referring now to FIG. 12, the falling evacuation steps are followed by a constant pressure evacuation and oxygen purge step. At this point in the cycle, the minimum evacuation pressure due to continued evacuation of bed A, at 130, has been reached and an oxygen purge is introduced to the top portion 43 of bed A from bed B, at 132. The pressure remains constant during this step because the purge flow is matched to the evacuation flow. Additionally, the oxygen content of the waste flow remains relatively constant.

Figure 13:
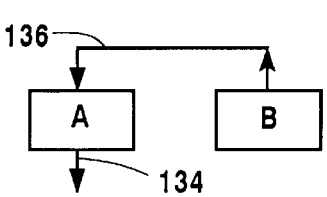

With reference to FIG. 13, the cycle culminates in a rising pressure evacuation and overlap equalization step wherein the single stage Roots vacuum pump continues to remove waste gas from the bottom portion 42 of bed A, at 134, while oxygen equalization is added to the top portion 45 of the adsorber from bed B, at 136. The pressure rises during this step as a result of the oxygen equalization flow, which is larger than the evacuation flow during this period. The oxygen concentration of the waste stream begins to elevate slightly at the end of this step as the oxygen (purge) front begins to break through at the bottom of the adsorber Table 1 below shows not only the actual step times for each of the steps described above and employed in desirable embodiments of the invention, but also the average beginning and end pressures for each processing step, summarizing the information provided above. Intermediate pressure values between the top adsorption pressure and the bottom desorption pressure are sometimes referred to herein as lower (or higher) intermediate rising (or falling) pressures.

Table 1 contains values representative of two-bed VPSA systems having a capacity within the range of 30–200 tpd employing a high-lithium exchange zeolite X adsorbent, producing an oxygen containing gas containing 88–95% O2 and achieving oxygen recoveries between 50 and 70%. The cycle employed is called the Product Pressurization with Purge and Overlap Equalization

TABLE I

| Step Description | Step Time | Start Pressure | End Pressure |
|---|---|---|---|
| Step #1 (FIG. 2) Rising pressure feed with overlap equalization | 2.0 | 8.85 | 13.8 |
| Step #2 (FIG. 3) Rising pressure feed with overlap product pressurization | 3.0 | 13.8 | 18.2 |
| Step #3 (FIG. 4) Rising pressure feed | 3.0 | 18.2 | 20.8 |
| Step #4 (FIG. 5) Constant pressure feed with make product | 1.0 | 20.8 | 20.8 |
| Step #5 (FIG. 6) Constant pressure feed with make product/purge | 2.5 | 20.8 | 20.9 |
| Step #6 (FIG. 7) Falling pressure equalization half cycle | 1.5 | 20.9 | 17.7 |
| Step #7 (FIG. 8) Falling pressure evacuation with overlap equalization | 2.0 | 17.7 | 12.3 |
| Step #8 & #9 & #10 (FIGS. 8–10) Falling pressure evacuation | 7.0 | 12.3 | 7.45 |
| Step #11 (FIG. 11) Constant pressure evacuation with Oxygen purge | 2.5 | 7.45 | 7.45 |
| Step #12 (FIG. 12) Raising pressure evacuation with overlap equalization | 1.5 | 7.45 | 8.85 |

The pressures in the above table are measured at the top of the adsorber, and are an average of both beds.

Figure 14:
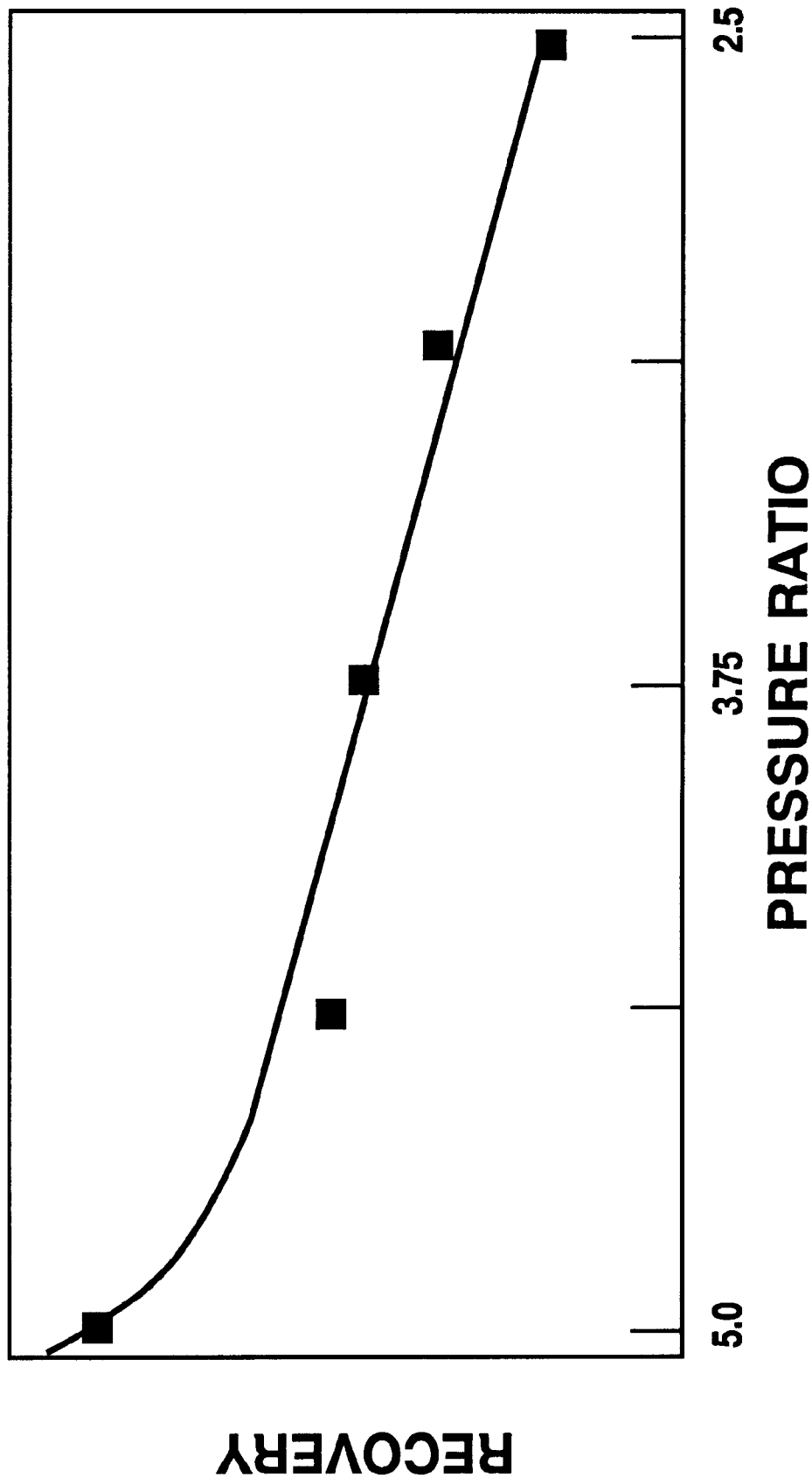
FIG. 14 is a graphical representation of the relationship between a VPSA pressure ratio and oxygen recovery.

Those skilled in the art will recognize that the VPSA system and process of the present invention operates at a relatively low operating pressure ratio within the range 2.5 to 4.0, or preferably within the range 2.5–3.0 and most preferably 2.75–3.0 that results in a lower oxygen recovery from the processed air. FIG. 14 illustrates graphically the expected and (qualitatively) the observed effect of lower pressure ratio on oxygen recovery. It should be noted that the numerical value of the desorption pressure is important because it is the high desorption pressure that makes it possible to decrease the costs associated with the equipment (simpler) and operation (more efficient) by use of the single-stage vacuum pump of this invention. As a result of the high desorption pressure, the pressure ratio will be lowered to a value that under conventional practice (a two-bed axial flow VPSA producing the same amount of oxygen at the same purity, using a multi-stage vacuum pump, and optimized to achieve recoveries of 60–70% at optimum unit power cost) would be considered suboptimal.

The conventionally expected consequence of this lower oxygen recovery would be a reduction in plant capacity as well as an increase in specific energy or power consumption. Contrary to this expectation, however, the inventors have discovered an unexpected advantage in that, although the oxygen recovery is indeed somewhat lowered (by about 5–10 percentage points compared to a conventional recovery of 60–70%), the average suction pressure to the waste vacuum pump is substantially increased by a large increase in mass flow to the vacuum pump without an increase in the cylinder displacement. The higher suction pressure to the pump also corresponds to a pressure differential reduction across the vacuum pump, which lowers the head and specific work per mole of waste removed. These effects more than offset the cost associated with reduction in oxygen recovery.

Figure 15:
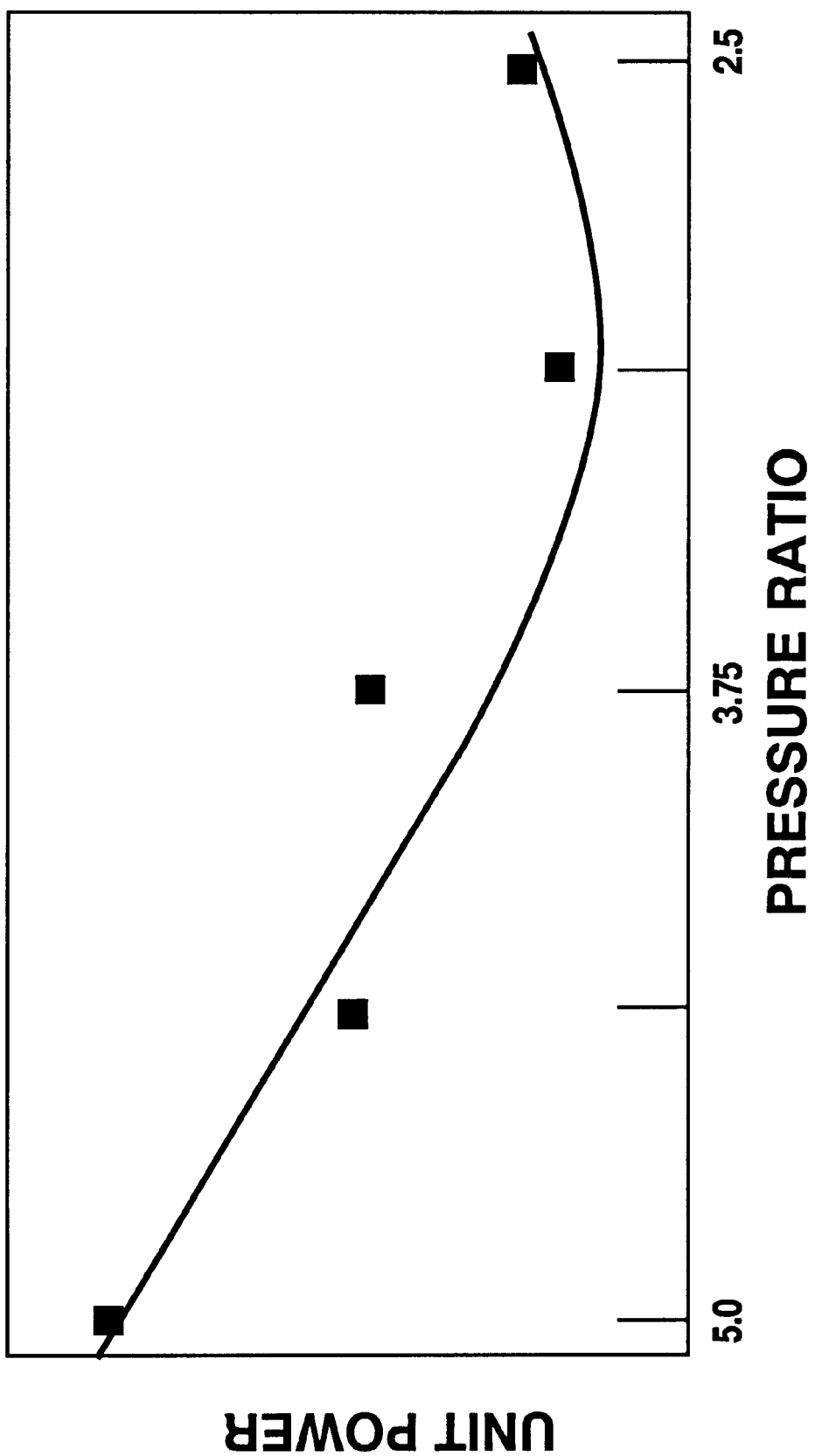
FIG. 15 is a graphical representation of the relationship between unit power consumption by a conventional VPSA system versus that of a system according to the present invention.

In fact both the average power consumption, and the vacuum pump capacity can be reduced if the power requirement is minimized (by use of analyses such as those of FIGS. 14 and 15).

As shown in FIG. 15, the unit power of the cycle realized by the system and method of the present invention is lower than that of the conventional pressure ratio cycle. The lowest power consumption for the equipment and adsorbent tested is achieved at a desorption pressure within the range of about 0.4 to 0.55 atmospheres with an adsorption pressure within the range of 1 to 2 atmospheres, preferably 1.3 to 1.6 atmospheres, resulting in an approximate pressure ratio within the range 2.75 to 3.0.

The afore-described savings attributable to the lower unit power, however, may be contravened (or even eclipsed) because of another problem created by the lower product recovery: if, despite the lower recovery, the product purity and output are to stay the same, a higher amount of gas must be put through the system (indeed, this is usually the case in commercial application where oxygen demand is constant and purity is constant). This can be done either by increasing the size of the VPSA system (which would increase capital costs and therefore defeat the cost-saving purpose) or by decreasing cycle time. Indeed, the present inventors have decreased the duration of those steps or substeps of the cycle that involve use of the vacuum pump (when the vacuum pump is processing waste gas needed to be evacuated from Bed A or Bed B). In terms of the foregoing Table, these are Steps 4, 5 and 6 and Steps 8–12. It will be understood that the cycle time reduction can be accomplished by decreasing the duration of at least two of the foregoing steps for a two-bed system. If the duration of one step is decreased during the pressurization portion of a cycle, the corresponding step during depressurization must also be decreased (e.g. steps 5 and 11).

As explained in the Background section, however, only limited reductions in cycle time can be effected without engendering additional inefficiencies, namely increasing adsorbent bed pressure drop, increasing adsorbent attrition, and creating a nonuniform gas flow through the adsorbent bed unless again the adsorbent bed size is increased. To the extent that these occur, they are addressed by using an adsorbent bed and vessel that permits low gas velocities, such as a radial flow vessel operated below the fluidized velocity according to the Ergun correlation. In addition, the adsorbent bed can be restrained. In sum, the present invention involves the discovery that the desorption pressure can be substantially increased even though the oxygen recovery will be lowered if a single stage vacuum pump is used, preferably in combination with a radial flow adsorbent bed vessel. The process can then be optimized for the same product output and purity at a lower operating cost and at the same or at a lower capital cost compared to a conventional two bed system optimized for the same oxygen output and purity but using a two-stage pump and axial flow adsorbers. It bears repeating that the VPSA system of the invention will probably obtain a lower oxygen recovery (no more than about 5–10 percentage points lower) than the recovery of the conventional bed system referred to in the preceding sentence. Nevertheless, the VPSA system of the present invention would not have to resort to larger adsorbers but (if needed) could use instead radial flow adsorbers that contain the same (or a smaller) amount of adsorbent as the axial beds of the conventional system with which the comparison is made.

Several modifications to the system and process described above are envisioned while still substantially preserving the desirable cost advantages associated with the present invention. For example, the cycle at Table 1 may be altered to operate without an oxygen purge step, effectively eliminating the operations associated with FIGS. 6 and 12. Such a modification would modestly decrease efficiency and produce a corresponding modest overall cost (sum of operating cost and capital costs). Thus, it is preferred to use an oxygen purge step. However, if the oxygen purge is omitted, the process cost will still be lower than if the same process (without O2 purge) were operating at a conventional pressure ratio or employed a multi-stage compressor or axial adsorber or any combination thereof.

Another alternative is to produce oxygen during the rising pressure feed and adsorption steps, effectively combining together the steps shown in FIGS. 4 through 6. Elimination of this feature would be anticipated to cause a modest increase in unit capital cost because the system would have to process more air in order to produce the same amount of oxygen per day at the same purity.

A further possible modification to the present invention includes eliminating the overlap equalization with feed air step, shown in FIGS. 2 and 7. This would reduce the load time fraction for the Roots compressor, while still allowing for complete equalization of the adsorbers. To effect this modification, the duration for the steps illustrated in FIGS. 7 and 13 would have to be increased. A modest unit capital cost increase would result from such a modification.

Those skilled in the art will appreciate the many benefits and advantages afforded by the process aspects of the present invention that contribute, overall, to reducing the power usage in a VPSA process, without an increase in capital cost. By reducing power consumption through implementation of relatively low power hardware and efficient operating steps, significant operating costs are minimized through improved efficiency. Unlike prior art processes, however, these savings are not eclipsed by higher operating costs.

One of the primary sources of power consumption in all VPSA systems is the vacuum pump. By implementing a cycle utilizing a relatively high bottom pressure, a single stage vacuum pump may be implemented rather than a conventionally utilized two stage pump. The elimination of a stage from the vacuum unit due to the high bottom pressure significantly lowers power consumption of the VPSA system.

Moreover, while utilizing a relatively low pressure ratio would normally reduce oxygen recovery in a VPSA system, by increasing the compressor feed flow and implementing a restrained adsorbent bed, such as a radial flow vessel to reduce the inlet feed velocity, any adverse recovery effects from the low pressure ratio are completely eliminated. A preferred optional feature involves use of a single-stage compressor in addition to the single-stage vacuum pump.

Lastly, the present invention makes it possible to use an uncooled vacuum pump, such as a PAS-J Whispair, available from Dresser Industries, Connorsville, Ind. By the term "uncooled vacuum pump" we mean a vacuum pump that is either not cooled via external means or is not capable of being cooled via external means. This is because the higher desorption pressure, in combination with the time required for desorption does not cause the pump to heat up to the point where its temperature tolerances are violated.

While the invention has been particularly shown and described with reference to the preferred embodiments thereof, it will be understood by those skilled in the art that various changes in form and detail may be made therein without departing from the spirit and scope of the invention.

The disclosures of Baksh, et al., U.S. Pat. Nos. 5,518,526 and LaSala, 5,370,728; and U.S. patent application Ser. No. 08/611,942 and 08/681,550 are incorporated by reference in their entirety. In case of conflict, however, the present disclosure controls.

What is claimed is:

1. In a two-adsorbent bed vacuum pressure swing adsorption method of separating a fluid mixture into respective first and second components, thereby producing a product enriched in said first component at a given output rate and at a given purity, said method including the steps of:
   (a) feeding said mixture into one of said adsorbent beds, said adsorbent beds being radial flow beds, at a flowrate to pressurize said adsorbent bed to a predetermined elevated adsorption pressure, said one adsorbent bed selectively adsorbing said second component at said predetermined elevated adsorption pressure;
   (b) adsorbing said second component from said mixture with said adsorbent bed;
   (c) passing non-adsorbed first component through said adsorbent bed as a product stream;
   (d) depressurizing said adsorbent bed to a desorption pressure to desorb said second component from said adsorbent bed;
   (e) the improvement comprising the steps of:
      (i) achieving said desorption pressure within the range of 0.3 to 1.0 atmospheres by use of a single-stage vacuum device thereby providing an adsorption to desorption pressure ratio with the range of 2.5 to 4.0 and causing the recovery of said first component to decrease by about 5–10 percentage points compared to the recovery achieved by a two-adsorbent bed vacuum pressure swing adsorption system comprising a multi-stage vacuum device and two axial flow adsorbent beds; and operated at optimal unit power consumption to produce the same product output at the same purity; and
      (ii) reducing the duration of at least a portion of two of said steps (a) through (d) thereby maintaining the output and purity of said product despite said recovery decrease and achieving a reduction in cost compared to said system.

2. A vacuum pressure swing adsorption method according to claim 1 wherein the improvement further comprises the feeding step including the steps of:
   pressurizing said adsorbent bed from approximately 8.85 PSIA to approximately 13.8 PSIA gradually over a duration of about 2 seconds;
   raising the pressure within said adsorbent bed from approximately 13.8 PSIA to approximately 18.2 PSIA over an approximate 3 second period; and
   increasing the pressure within said adsorbent bed from said approximately 18.2 PSIA to approximately 20.8 PSIA over an approximate 3 second duration following expiration of said raising step.

3. A pressure swing adsorption method according to claim 2 wherein said feeding step further includes the step of equalizing said adsorption bed with a gas the equalization overlapping with said pressurizing step.

4. A pressure swing adsorption method according to claim 1 wherein the adsorbing step includes maintaining said predetermined elevated adsorbent pressure relatively constant for a predetermined period.

5. A pressure swing adsorption method according to claim 4 wherein the improvement further comprises the step of raising said adsorbent bed pressure to an initial pressure of approximately 8.85 PSIA by introducing an equalization flow over a duration of approximately 1.5 seconds.

6. A pressure swing adsorption method according to claim 1 wherein the improvement further comprises said depressurizing step including:
   lowering the pressure of said adsorbent bed from said predetermined elevated adsorption pressure to approximately 17.7 PSIA over a duration of approximately 1.5 seconds;
   reducing pressure from said approximately 17.7 PSIA to approximately 12.3 PSIA over a duration of approximately 2 seconds;
   evacuating said adsorbent bed from said approximately 12.3 PSIA to a bottom pressure of approximately 7.45 PSIA at the expiration of said approximate 2 second duration over a period of approximately 7 seconds; and
   desorbing said second component from said adsorbent bed during said reducing and evacuating steps.

7. A pressure swing adsorption method according to claim 6 wherein the improvement further comprises the step of:
   purging said adsorbent bed for a duration of approximately 2.5 seconds following said evacuating step; and
   maintaining said bottom pressure during said purging step.

8. The method of claim 1, wherein said single stage vacuum device is not cooled via external means.

9. The method of claim 1, wherein said desorption pressure is within the range of 0.4 to 1.0 atmospheres.

10. In a vacuum pressure swing adsorption process for the separation of oxygen from air at a purity of 88–95% and at a predetermined output rate in an adsorption system having a first and second adsorbent bed containing an adsorbent material selectively adsorbing nitrogen, said process being carried out within a cycle time in each of said adsorbent beds on a cyclic overlapping basis and comprising the following steps:
   (a) feeding air to a feed end of the adsorbent bed while gas is simultaneously introduced to a product end of the first bed said gas obtained from a depressurization step of the second bed, thereby pressurizing the first bed from a lower intermediate rising pressure to an intermediate rising pressure;
   (b) continuing feeding air to said feed end thereby further pressurizing the first bed from the intermediate rising pressure to a higher intermediate pressure while product oxygen from a surge tank is simultaneously introduced to said product end;
   (c) further continuing feeding air to said feed and thereby further pressurizing the first bed to a top adsorption pressure;
   (d) further continuing feeding air to said feed end while adsorbing the nitrogen to said first bed and withdrawing said oxygen product from said product end, while the pressure is maintained at about said top adsorption pressure, a portion of said oxygen product being directed to said surge tank;
   (e) cocurrently depressurizing the first bed from the top adsorption pressure to a higher intermediate falling pressure with withdrawal of waste gas from the product end for use as pressure equalization gas in the second bed;
   (f) countercurrently depressurizing the first bed to a lower intermediate falling pressure by removing waste gas from the feed end while simultaneously removing gas from the product end for use in a pressurization step of the second bed;

(g) further countercurrently depressurizing the first bed to a bottom desorption pressure by removing additional waste gas from the feed end;

(h) introducing oxygen into said product end to purge said adsorbent bed while the pressure remains at about the bottom desorption pressure and further evacuating waste gas from the feed end;

(i) continuing to introduce oxygen into said product end and to discharge waste gas from the feed end while pressurizing the first bed from the bottom desorption pressure to a lower intermediate rising pressure, the improvement comprising:

employing a bottom desorption pressure within the range of 0.3–1.0 atmospheres effected by a single-stage vacuum pump;

employing a ratio of a top adsorption pressure to bottom desorption pressure of between 2.5 and 4.0; and employing radial flow beds as the adsorbent beds; and employing a shorter cycle time than a conventional two bed vacuum pressure swing adsorption process employing a multistage vacuum pump and axial flow beds and operating at optimum unit power cost to produce oxygen at the same output rate and purity; whereby the overall cost of producing oxygen is decreased compared to said conventional process.

11. The method of claim 10, wherein said single stage vacuum device is not cooled via external means.

12. The method of claim 10, wherein said desorption pressure is within the range of 0.4 to 1.0 atmospheres.

* * * * *